US012717920B2

(12) United States Patent
Hu et al.

(10) Patent No.: US 12,717,920 B2
(45) Date of Patent: Aug. 25, 2026

(54) PIPELINE FOR REWRITING AND VALIDATING MALICIOUS CODE WITH GENERATIVE ARTIFICIAL INTELLIGENCE

(71) Applicant: Palo Alto Networks, Inc., Santa Clara, CA (US)

(72) Inventors: Lucas Mingyuan Hu, Palo Alto, CA (US); Shaown Sarker, San Jose, CA (US); Tung-Ling Li, Fremont, CA (US); William Russell Melicher, Sunnyvale, CA (US); Mohamed Yoosuf Mohamed Nabeel, San Jose, CA (US); Oleksii Starov, Sunnyvale, CA (US); Wei Wang, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 139 days.

(21) Appl. No.: 18/605,076

(22) Filed: Mar. 14, 2024

(65) Prior Publication Data

US 2025/0291918 A1 Sep. 18, 2025

(51) Int. Cl.
*G06F 21/56* (2013.01)
*G06N 20/00* (2019.01)

(52) U.S. Cl.
CPC .......... *G06F 21/566* (2013.01); *G06N 20/00* (2019.01); *G06F 2221/034* (2013.01)

(58) Field of Classification Search
CPC ........ G06F 21/14; G06F 21/56; G06F 21/554; G06F 21/564; G06F 21/566; G06F 21/1066; G06F 2221/034; G06N 20/00; G06N 5/04

(Continued)

(56) References Cited

U.S. PATENT DOCUMENTS 8,261,344 B2 * 9/2012 Godwood ............ G06F 21/564 713/188
9,471,288 B2 * 10/2016 Miller ..................... G06F 8/70

(Continued)

OTHER PUBLICATIONS

Collberg, et al., "A Taxonomy of Obfuscating Transformations", Computer Science Technical Reports 148 , The University of Auckland, <https://researchspace.auckland.ac.nz/bitstream/handle/2292/3491/TR148.pdf?sequence=2&isAllowed=y>, Jan. 1997.

(Continued)

*Primary Examiner* — James N Fiorillo
(74) *Attorney, Agent, or Firm* — Gilliam IP PLLC

(57) ABSTRACT

A code sample rewrite pipeline has been created that augments training data for training malicious code detection models to learn functionality/execution behavior of malicious code and increase detection capability despite evasion techniques. The code sample rewrite pipeline ingests a set of malicious code samples. For each of the malicious code samples, the code sample rewrite pipeline prompts a language model to rewrite the malicious code sample with obfuscating transformations. The code sample rewrite pipeline evaluates output of the language model to determine whether the output is valid program code and whether it maintains functionality of the original malicious code sample. If the rewritten malicious code sample is valid and maintains functionality of the original malicious code sample, then the rewritten malicious code sample can be incorporated into training data for malicious code detection models.

19 Claims, 4 Drawing Sheets

(58) Field of Classification Search
USPC .............................................................. 726/23
See application file for complete search history.

(56) References Cited

U.S. PATENT DOCUMENTS

| | | | | |
|---|---|---|---|---|
| 10,521,587 | B1 * | 12/2019 | Agranonik | G06F 21/563 |
| 11,010,472 | B1 * | 5/2021 | Powers | G06F 21/562 |
| 12,019,746 | B1 * | 6/2024 | Smith | G06F 21/564 |
| 12,153,684 | B2 * | 11/2024 | Chan | G06F 21/577 |
| 12,265,618 | B1 * | 4/2025 | David | G06F 21/563 |
| 2011/0307954 | A1 * | 12/2011 | Melnik | G06F 21/56 726/22 |
| 2015/0143452 | A1 * | 5/2015 | Hamlen | G06F 21/51 726/1 |
| 2017/0063923 | A1 * | 3/2017 | Yang | G06F 21/56 |
| 2018/0300480 | A1 * | 10/2018 | Sawhney | G06F 21/563 |
| 2019/0141064 | A1 * | 5/2019 | Call | H04L 63/1483 |
| 2021/0176233 | A1 * | 6/2021 | Starov | H04L 63/1441 |
| 2022/0116411 | A1 * | 4/2022 | Melicher | G06F 21/566 |
| 2022/0414214 | A1 * | 12/2022 | Strogov | G06F 21/563 |
| 2023/0274089 | A1 * | 8/2023 | Tunstall-Pedoe | G06F 40/40 704/2 |
| 2023/0342466 | A1 * | 10/2023 | Briliauskas | G06N 3/08 |
| 2024/0232353 | A1 * | 7/2024 | Briliauskas | G06F 21/566 |
| 2024/0411882 | A1 * | 12/2024 | Plate | G06F 21/566 |
| 2025/0094581 | A1 * | 3/2025 | David | G06F 21/563 |
| 2025/0139493 | A1 * | 5/2025 | Kimura | G06N 3/045 |
| 2025/0173403 | A1 * | 5/2025 | Mathialagan | G06F 21/1066 |
| 2025/0208861 | A1 * | 6/2025 | Schwyzer | G06F 8/74 |
| 2025/0209543 | A1 * | 6/2025 | Muthu | G06N 20/00 |
| 2025/0217479 | A1 * | 7/2025 | Palanki | G06N 20/20 |
| 2025/0245122 | A1 * | 7/2025 | Schaefer | G06N 3/045 |
| 2025/0291905 | A1 * | 9/2025 | Griffin | G06F 21/554 |

OTHER PUBLICATIONS

Kim, et al., "LOM: Lightweight Classifier for Obfuscation Methods", Information Security Applications: 22nd International Conference, WISA 2021, Part of Lecture Notes in Computer Science (LNSC, vol. 13009), pp. 3-15 <https://doi.org/10.1007/978-3-030-89432-0_1>.

Mulgrew, "Building a Zero Day Virus with ChatGPT", [online], [retrieved on Feb. 15, 2024] Retrieved from the Internet: <https://www.forcepoint.com/blog/x-labs/zero-day-exfiltration-using-chatgpt-prompts>.

Zafar, et al., "Language and Obfuscation Oblivious Source Code Authorship Attribution", In IEEE Access, vol. 8, pp. 197581-197596, 2020, doi: 10.1109/ACCESS.2020.3034932.

* cited by examiner

PIPELINE FOR REWRITING AND VALIDATING MALICIOUS CODE WITH GENERATIVE ARTIFICIAL INTELLIGENCE

BACKGROUND

The disclosure generally relates to transmission of digital information (e.g., CPC class H04L) and a security arrangement for protecting computers, components thereof, programs or data against unauthorized activity (e.g., CPC subclass G06F 21/00).

Code obfuscation can be used for legitimate purposes (e.g., to prevent reverse engineering). However, code obfuscation techniques are also employed on malware to evade detection by cybersecurity systems. Examples of code obfuscation techniques include minification, variable renaming, string-splitting, and dead code insertion. A code obfuscation tool or obfuscator provides functionality to apply one or more of these obfuscation transforms to program code. A user would load program code to be transformed, select transformations based on capability of the tool, and select settings for the transformations. Alternatively, the user creates a configuration file that specifies a transform and which parts of the program code to apply the obfuscate transform.

Some generative artificial intelligence (AI) technologies are built upon transformer models. The "Transformer" architecture was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a foundational model and there has been subsequent research in similar Transformer-based sequence modeling. Architecture of a Transformer model typically is a neural network with transformer blocks/layers, which include self-attention layers, feed-forward layers, and normalization layers. The Transformer model learns context and meaning by tracking relationships in sequential data. Some large scale language models ("LLMs") are based on the Transformer architecture.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

While machine learning technologies have been used to train malicious code detection models, generative AI tools are being offered to malicious actors for easy creation of malicious code (e.g., malware and phishing code). Fortunately, these tools are currently not effective for malicious code generation. However, generative AI tools may increase the efficiency of obfuscation transformations over existing code obfuscation tools, including cosmetic transformations, and facilitate evasion.

A code sample rewrite pipeline has been created that augments training data for training malicious code detection models to learn functionality/execution behavior of malicious code and increase detection capability despite evasion techniques. The code sample rewrite pipeline ingests a set of malicious code samples. For each of the malicious code samples, the code sample rewrite pipeline prompts a language model to rewrite the malicious code sample with obfuscating transformations, such as data, structural, and control flow obfuscations. The code sample rewrite pipeline evaluates output of the language model to determine whether the output is valid program code and whether it maintains functionality of the original malicious code sample. If the rewritten malicious code sample is valid and maintains functionality of the original malicious code sample, then the rewritten malicious code sample can be incorporated into training data for malicious code detection models.

Example Illustrations

Figure 1:
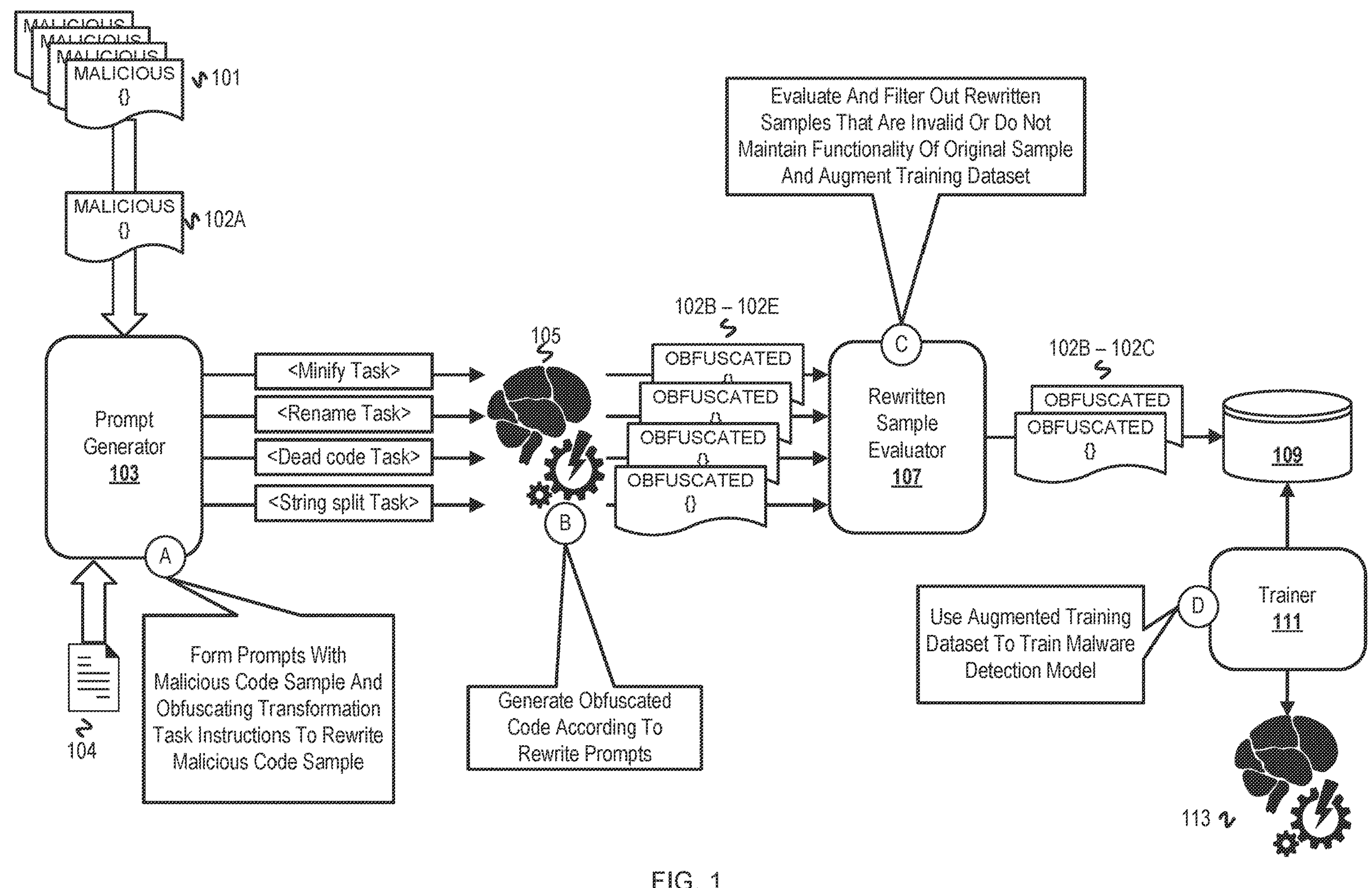
FIG. 1 is a diagram of a code sample rewrite pipeline creating rewritten malicious code samples to augment a training dataset for malicious code detection training.

FIG. 1 is a diagram of a code sample rewrite pipeline creating rewritten malicious code samples to augment a training dataset for malicious code detection training. The pipeline includes a prompt generator 103, a language model 105, and a rewritten sample evaluator 107. The code sample rewrite pipeline (hereinafter "rewrite pipeline") is configured to insert rewritten malicious code samples into a database/repository 109.

FIG. 1 is annotated with a series of letters A-D, each of which represents one or more operations. Although these stages are ordered for this example, the stages illustrate one example to aid in understanding this disclosure and should not be used to limit the claims. Subject matter falling within the scope of the claims can vary from what is illustrated.

At stage A, the prompt generator 103 ingests malicious code samples to rewrite with obfuscate transforms. A dataset 101 includes multiple known malicious code samples, such as code for skimming, adware, cryptomining, cloaking, document object model (DOM) injections, etc. The prompt generator 103 ingests a malicious code sample 102A from the dataset 101. The prompt generator 103 then forms prompts with the malicious code sample 102A and instructions in a prompt template 104. The task instructions are instructions for applying a set of obfuscating transformations. For example, the instructions include instructions for a minify task, a renaming task, a dead code insertion task, and a string splitting task. The prompt generator 103 forms the prompts for the language model 105 based on the instructions for obfuscating transformation tasks. Depending upon the template, the prompt generator 103 can form individual prompts for the individual obfuscating transformation tasks or for a prompt to generate cascading rewrites of the malicious code sample 102A.

At stage B, the language model 105 generates obfuscated code according to the rewrite prompt(s) generated by the prompt generator 103. If the language model 105 was prompted to apply the obfuscate transforms in a cascading manner, then the language model 105 generates outputs 102B-102E with each having successively more obfuscation. As an example, the output 102B is minified, the output 102C has been minified and the variables renamed, the output 102D includes dead code after being minified and variables renamed, and the output 102E has split strings after dead code has been inserted after variables have been renamed and after minification. As a different example, the language model 105 may have been prompted to perform the obfuscate transforms individually and generate the output 102B as a minified version of the malicious code sample 102A, the output 102C as a version of the malicious code sample 102A with variables and functions renamed, the output 102C as a version of the malicious code sample 102A with dead code inserted, and the output 102E as version of the malicious code sample 102A with some strings split. While the examples refer to artificial neural network based classifiers, embodiments can use other types of classifiers, such as tree-based classifiers.

At stage C, the rewritten sample evaluator 107 evaluates each of the outputs 102B-102E and augments a training dataset with those determined to satisfy the evaluation. The evaluation involves determining whether an output is valid program code and whether an output maintains the functionality of the malicious code sample 102A. To determine whether functionality is maintained, the evaluator 107 analyzes one or more aspects of functionality, such as execution behavior and code structure. The evaluator 107 can insert into the repository 109 those of the rewritten malicious code samples output by the language model 105 that satisfy evaluation.

At stage D, a trainer 111 retrieves from the repository 109 training data to train a malicious code detection model 113. With the rewritten malicious code samples in the training data, the malicious code detection model 113 learns to detect malicious code with similar functionality as the malicious code samples 101 despite obfuscating transformations. The augmented training dataset can include at least some of the original malicious code samples, but does not necessarily include any of the malicious code samples used to generate the rewritten code samples.

Figure 2:
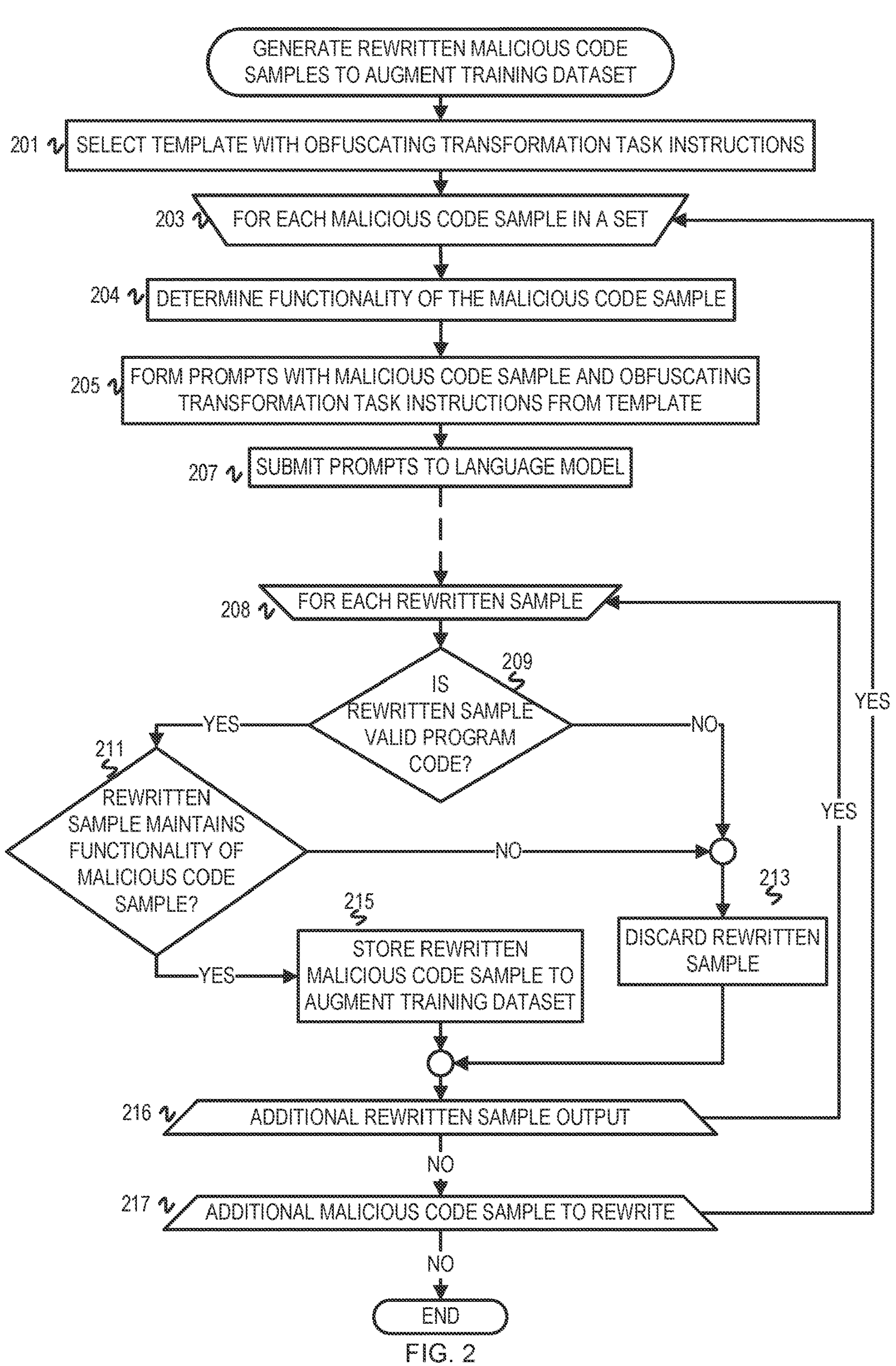
FIG. 2 is a flowchart of example operations for generating rewritten malicious code samples to augment a training dataset.
Figure 3:
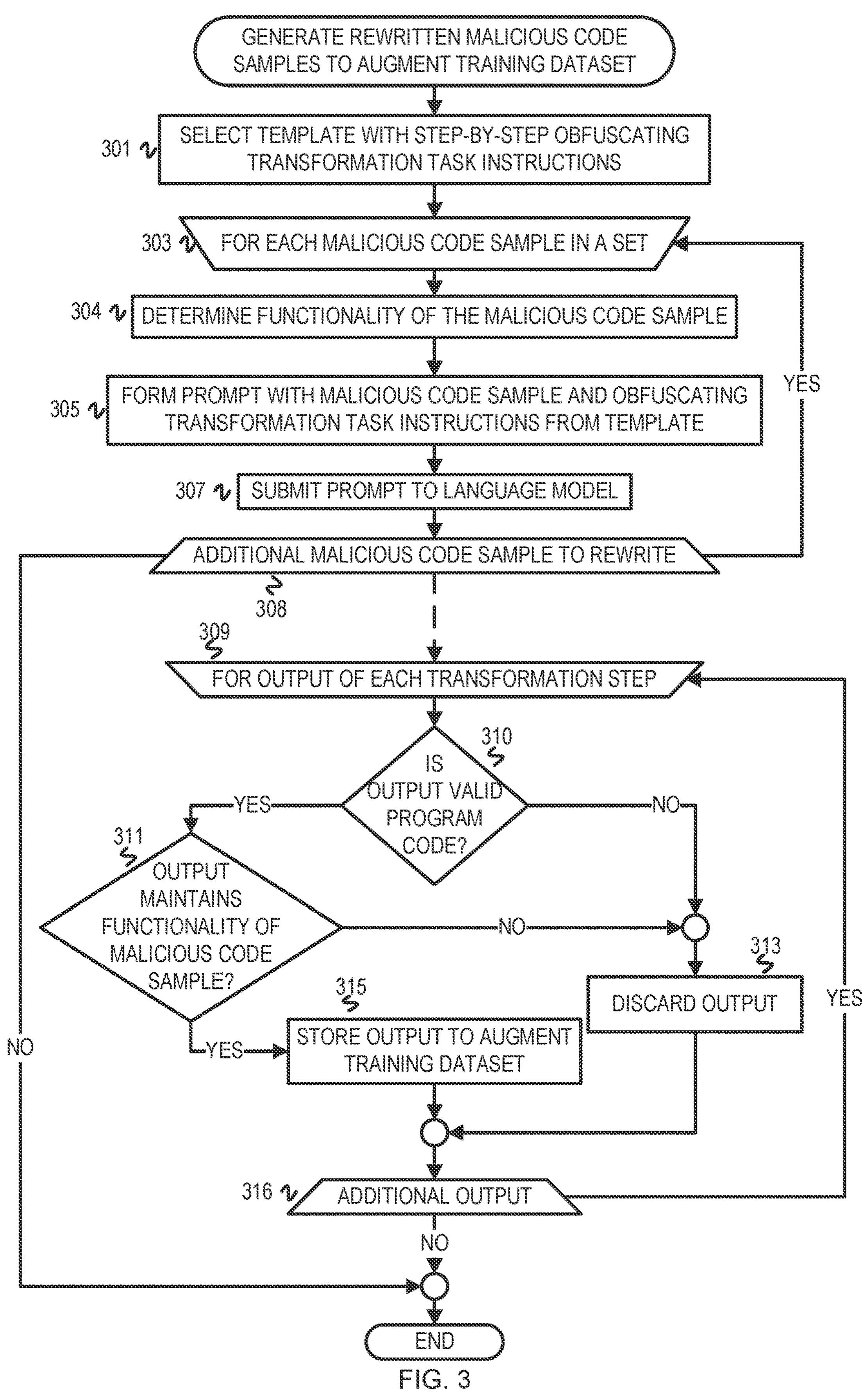
FIG. 3 is a flowchart of example operations for generating rewritten malicious code samples to augment a training dataset.

FIGS. 2 and 3 are flowcharts of example operations for generating rewritten malicious code samples with different prompt generation paradigms. The example operations are described with reference to a rewrite pipeline for consistency with FIG. 1 and ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. While the rewrite pipeline has been depicted as including a language model, this inclusion of the language model is likely with application programming interface (API) calls defined for the language model to submit a generated prompt to the language model and to specify a destination(s) for the output (i.e., rewritten code samples) from the language model.

FIG. 2 is a flowchart of example operations for generating rewritten malicious code samples to augment a training dataset. The example operations of FIG. 2 generate a prompt per obfuscating transformation task.

At block 201, the rewrite pipeline selects a template(s) that has obfuscating transformation task instructions. Implementations can provide for a template per obfuscating transformation task or include multiple obfuscating transformation tasks within a template. Furthermore, different templates can be written to apply different sets of obfuscating transformation tasks and or obfuscating transformation tasks in different orders. Selection of the template can be determined non-deterministically (e.g., random selection from a pool of templates) or deterministically (e.g., selecting as configured). To illustrate, presume a template that has default instructions with a variable to be set for each different obfuscating transformation, such as minify, dead code insertion, and string splitting. The template can begin with an overall instruction to rewrite a specified code sample. The template can include markers to guide placement of the original code sample to be rewritten. The overall rewrite instruction can also specify that functionality of the original code sample is to be maintained. The overall rewrite instruction and the instructions for each obfuscating transformation can request that the language model explain the obfuscating transformation and explain why the obfuscating transformation does not modify functionality. The rewrite instructions can also allow for the language model to apply other obfuscating transformations than those specified in the prompt. The prompt template also includes instructions on how to format the output to allow the output to be parsed. For instance, the prompt template includes instructions that specify how to delineate the original malicious code sample, the rewritten sample, and the explanation corresponding to the obfuscating transformation(s) of a step. The prompt template can also include instructions to provide hints and/or constraints to the language model. For example, the prompt template includes a listing of function names and/or variables that should not be changed.

At block 203, the rewrite pipeline begins to iterate through samples in a set of malicious code samples. The malicious code sample set can be a curated set of malicious code samples and can be intermittently updated as malicious code samples are discovered.

At block 204, the rewrite pipeline determines functionality of the malicious code sample. The rewrite pipeline determines functionality of the malicious code sample with respect to criteria that will be used to determine whether a rewritten version of the malicious code maintains or preserves functionality of the original malicious code sample. As an example, criteria can be specified that all execution behaviors detected for the original malicious code sample be maintained in a rewritten version, frequency of built-in keywords for the programming language of the malicious code sample be the same or within a tolerance of variation, and that object identifiers remain unchanged. The collective attributes specified in the criteria represent functionality of the malicious code sample. The rewrite pipeline organizes the determined functionality attributes into a data structure that can be referred to as a functionality profile. To determine execution behaviors, the rewrite pipeline can invoke a tool or execution environment to simulate the execution paths of the original malicious code sample. Examples of the execution behaviors that can be determined from simulating execution paths include link injections, document object model (DOM) or Hypertext Transfer Protocol (HTTP) injections, redirects, etc. One example of an execution environment for abstract execution that can be used to determine execution behaviors is the execution environment described in in U.S. Non-Provisional patent application Ser. No. 17/500,308 which published as US2022/0116411 on 2022 Apr. 14 and which is incorporated by reference in its entirety. The execution environment can perform static analysis with abstract interpretation/execution. The execution environment executes branched execution paths with abstract values to approximate code execution down the various paths. The execution environment calculates and maintains execution state for each execution path. State explosion is avoided or at least minimized by applying concrete execution to those portions of the code sample with predictable control flow (e.g., functions that lack branching).

At block 205, the rewrite pipeline forms prompts with the malicious code sample and obfuscating transformation task instructions from the template and at block 207 the rewrite pipeline submits the prompts to the language model. The rewrite pipeline can generate the prompts into a buffer and then begin submitting each generated prompt. The cadence of submission can vary depending upon attributes of the language model and of the environment (e.g., network conditions). The rewrite pipeline can traverse the template and generate a prompt with the malicious code sample and instructions of an obfuscating transformation task as encountered. A prompt is not necessarily limited to a single obfuscating transformation task. A template can provide for a combination of tasks to populate a prompt. Alternatively, the rewrite pipeline can select from templates as configured. A dashed line from block 207 to block 208 represents asynchronous flow to block 208 since timing of the output depends upon the language model implementation and hosting.

At block 208, the rewrite pipeline begins to process each re-written sample output from the language model. The set of operations includes those for evaluating the rewritten samples generated by the language model.

At block 209, the rewrite pipeline determines whether a rewritten sample is valid program code. For instance, the rewrite pipeline determines a program language of the original malicious code sample and selects/invokes a parser according to the determined program language. With the parser, the rewrite pipeline parses the rewritten sample to determine whether it includes any syntax errors. If the rewrite pipeline determines that the rewritten sample is not valid program code, then operational flow proceeds to block 213. If the rewrite pipeline determines that the rewritten sample is valid program code, then operational flow proceeds to block 211.

At block 213, the rewrite pipeline discards the rewritten sample. Embodiments may maintain a store of invalid rewritten samples for use in static analysis.

At block 211, the rewrite pipeline determines whether the rewritten sample maintains functionality of the original malicious code sample. The rewrite pipeline uses the analysis technique that was used for the original malicious code sample to determine functionality of the rewritten sample. For example, the rewrite pipeline creates a functionality profile for the for the rewritten sample and compares it against the functionality profile of the original based on the defined criteria for a determination that functionality has been maintained. If the frequency of a built-in keyword has changed between the original and a rewritten code sample or an object identifier tracked from the malicious code sample has changed, then the rewrite pipeline deems the rewritten code sample as not maintaining functionality of the original. If the rewrite pipeline determines that the rewritten sample does not maintain functionality of the original malicious code sample, then operational flow proceeds to block 213. If the rewrite pipeline determines that the rewritten sample maintains functionality of the original malicious code sample, then operational flow proceeds to block 215.

At block 215, the rewrite pipeline stores the rewritten malicious code sample to augment a training data set. For instance, the rewrite pipeline can store the rewritten malicious code sample to a destination specified for the rewritten malicious code samples. As another example, the rewrite pipeline can store the rewritten malicious code sample to a destination that also hosts the training data set being augmented.

At block 216, the rewrite pipeline determines whether there is an additional rewritten malicious code sample output from the language model to process. If so, then operational flow returns to block 208. Otherwise, operational flow proceeds to block 217.

At block 217, the rewrite pipeline determines whether there is an additional malicious code sample in the malicious code sample set to rewrite. If there is an additional malicious code sample to rewrite, then operational flow returns to block 203. Otherwise, the example operations of FIG. 2 end.

FIG. 3 is a flowchart of example operations for generating rewritten malicious code samples to augment a training dataset. In contrast to FIG. 2, the example operations of FIG. 3 generate a prompt with instructions to apply multiple obfuscating transformations. Thus, the language model generates multiple versions of a malicious code sample from a single prompt. In addition, the flowchart of FIG. 3 presents differently to represent generating a prompt asynchronously with respect to evaluating language model outputs. For instance, prompt generation may be complete for a malicious code sample set while prompts are still "in-flight" (e.g., buffered awaiting processing by the language model) and/or while rewritten sample evaluation is ongoing.

The example operations of FIG. 3 are substantially similar to FIG. 2. For brevity, the similar operations are minimally described to reduce repetitive text. At block 301, the rewrite pipeline selects a template that has step-by-step obfuscating transformation task instructions for multiple obfuscating transformation tasks. At block 303, the rewrite pipeline begins to iterate through samples in a set of malicious code samples. At block 304, the rewrite pipeline determines functionality of the malicious code sample.

At block 305, the rewrite pipeline forms a prompt with the malicious code sample and obfuscating transformation task instructions from the template. The instructions can instruct the language model to apply the multiple obfuscating transformations in a cascading manner or individually for the language model to generate a rewritten sample at each step.

At block 307, the rewrite pipeline submits the prompt to the language model.

At block 308, the rewrite pipeline determines whether there is an additional malicious code sample in the malicious code sample set to rewrite. If there is an additional malicious code sample to rewrite, then operational flow returns to block 303. Otherwise, the example operations for prompt generation for this malicious code sample set ends. A dashed line from block 308 to block 309 represents asynchronous flow to block 309 since processing time of the language model depends upon variables likely external to the rewrite pipeline, such as the language model implementation and hosting environment or platform.

At block 309, the rewrite pipeline begins to process each re-written sample output from the language model. At block 310, the rewrite pipeline determines whether a rewritten sample is valid program code. If the rewrite pipeline determines that the rewritten sample is not valid program code, then operational flow proceeds to block 313. If the rewrite pipeline determines that the rewritten sample is valid program code, then operational flow proceeds to block 311. At block 313, the rewrite pipeline discards the rewritten sample. At block 311, the rewrite pipeline determines whether the rewritten sample maintains functionality of the original malicious code sample. If the rewrite pipeline determines that the rewritten sample does not maintain functionality of the original malicious code sample, then operational flow proceeds to block 313. If the rewrite pipeline determines that the rewritten sample maintains functionality of the original malicious code sample, then operational flow proceeds to block 315. At block 315, the rewrite pipeline stores the rewritten malicious code sample to augment a training data set. At block 316, the rewrite pipeline determines whether there is an additional rewritten malicious code sample output from the language model to process. If so, then operational flow returns to block 309. Otherwise, operational flow ends.

Variations

The described examples analyze obfuscated program code generated by a model to determine whether the generated code is valid and maintains behavior of the original malicious code sample. Embodiments that analyze keyword frequency as at least one factor in determining whether behavior is maintained, can implement flexibility in the criteria. For instance, criteria for determining that the behavior is maintained in terms of keyword frequency can be that behavior is maintained as long as frequency of all tracked built-in keywords do not decrease. As another example, a built-in keyword criterion can be defined with a condition that behavior is maintained as long as any one of the tracked built-in keywords does not decrease to 0. This flexibility can also be applied to memory content that represents an aspect of behavior. For instance, a criterion can be defined that indicates behavior is maintained if all memory content of a rewritten malicious code generated from a model is the same when executed in a sandbox environment and compared to the memory content of the sandbox environment for the original malicious code sample.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
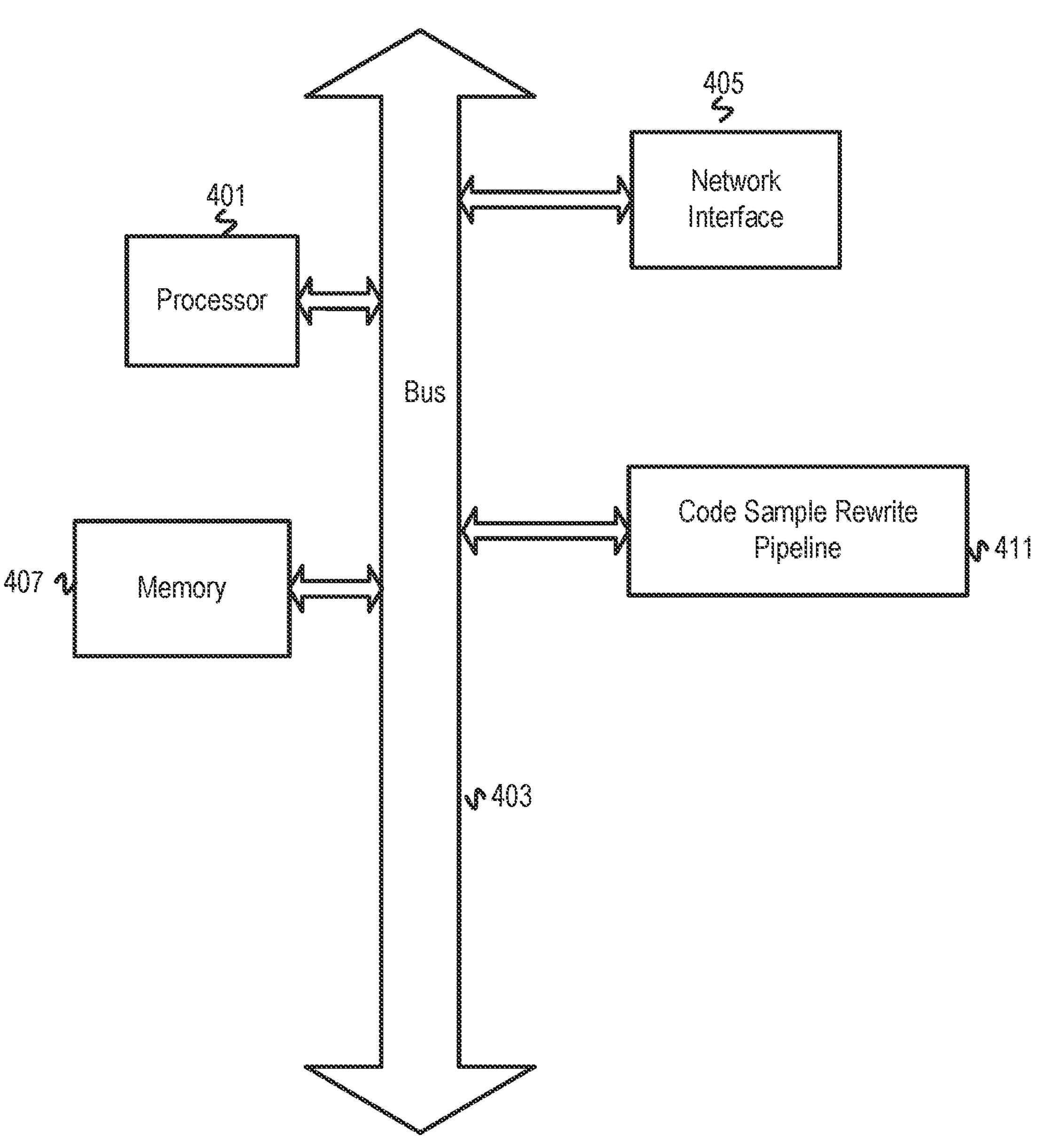
FIG. 4 depicts an example computer system with a code sample rewrite pipeline.

FIG. 4 depicts an example computer system with a code sample rewrite pipeline. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes code sample rewrite pipeline 411. The code sample rewrite pipeline 411 includes multiple components, but the description refers to the pipeline as performing the operations of the components for simplicity. The code sample rewrite pipeline 411 iteratively selects malicious code samples from a set of malicious code samples and rewrites them based on obfuscating transformations. The code sample rewrite pipeline 411 analyses each of the malicious code samples to determine functionality as represented by execution behaviors according to criteria defined for determining whether functionality has been maintained ("same functionality criteria"). The code sample rewrite pipeline 411 generates a prompt based on a prompt template and the malicious code sample. The prompt template includes task instructions for rewriting the malicious code sample according to one or more of a list of obfuscating transformations. The task instructions also specify that functionality should be maintained. The code sample rewrite pipeline 411 submits the prompt to a language model, for example with an API call. The output from the language model is evaluated to determine whether the rewritten code sample from the language model is syntactically correct and maintains functionality based on the same functionality criteria. Rewritten code samples evaluated as being syntactically correct and maintaining functionality of the original malicious code sample can be used to augment a training dataset. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

generating rewritten malicious code samples, wherein the generating comprises, prompting a language model to rewrite each of a plurality of malicious code samples according to at least one code obfuscation technique, wherein prompting the language model to rewrite each malicious code sample into multiple obfuscated transformations comprises for each of the plurality of malicious code samples, selecting a plurality of obfuscating transformations tasks, wherein each of the plurality of obfuscating transformation tasks is different; and prompting the language model to rewrite the malicious code sample according to each of the plurality of obfuscating transformation tasks, to preserve functionality of the malicious code sample in the obfuscated transformations, and to explain why the rewrite does not modify functionality of the malicious code sample;

evaluating output of the language model as being valid code and having similar behavior as the corresponding one of the plurality of malicious code samples, wherein the evaluating yields the rewritten malicious code samples; and training a malware detection model with a first training dataset which includes the rewritten malicious code samples.

2. The method of claim 1, wherein evaluating output of the language model as having similar behavior as one of the plurality of malicious code samples comprises evaluating the output and the corresponding one of the malicious code samples to determine that the behavior satisfies similarity criteria corresponding at least to execution behavior and program language keywords.

3. The method of claim 1 wherein evaluating output of the language model as being valid code comprises determining whether the output is syntactically correct.

4. The method of claim 1, wherein prompting the language model to rewrite each of the plurality of malicious code samples comprises, for each of the plurality of malicious code samples:

selecting a task instruction corresponding to the at least one code obfuscation technique; and forming a prompt indicating the selected task instruction and the malicious code sample.

5. The method of claim 1, wherein evaluating output of the language model for each of the plurality of malicious code samples as being valid code and having similar behavior as the corresponding one of the plurality of malicious code samples comprises filtering out each rewritten malicious code sample generated from the malicious code sample that is invalid or does not have similar behavior and selecting from remaining ones of the rewritten versions of the malicious code sample.

6. The method of claim 1, wherein the first training dataset includes at least some of the plurality of malicious code samples.

7. The method of claim 1, wherein prompting the language model to rewrite the malicious code sample according to each of the plurality of obfuscating transformation tasks comprises prompting the language model to rewrite the code sample according to different orderings of multiple of the plurality of obfuscating transformation tasks.

8. The method of claim 1, wherein prompting the language model to rewrite the malicious code sample according to each of the plurality of obfuscating transformation tasks comprises prompting the language model to rewrite the code sample into the multiple obfuscated transformations with successively more obfuscation.

9. A non-transitory, machine-readable medium having program code stored thereon, the program code comprising instructions to:

select a set of one or more malicious code samples;

for each of the set of malicious code samples, select a set of obfuscating transformation tasks which correspond to different obfuscation techniques;

form a set of one or more prompts with the selected set of obfuscated transformation tasks, task instructions to rewrite the malicious code sample according to different orderings or different combinations of the selected set of obfuscated transformation tasks while preserving functionality of the malicious code sample, and a task instruction to explain why functionality of the malicious code sample was not modified by the rewrites; and submit the prompt to a language model to obtain rewritten malicious code samples; and form a training dataset with at least a subset of the rewritten malicious code samples, a plurality of malicious code samples, and benign code samples.

10. The non-transitory machine-readable medium of claim 9, wherein the program code further comprises instructions to filter out each of the rewritten malicious code samples obtained from the language model that is either not valid or does not maintain functionality of a corresponding one of the set of malicious code samples.

11. The non-transitory machine-readable medium of claim 10, wherein the instructions to filter out comprise instructions to determine whether a rewritten malicious code sample is syntactically correct and whether a rewritten malicious code sample maintains functionality of the corresponding one of the set of malicious code samples.

12. The non-transitory machine-readable medium of claim 9, wherein the program code further comprises instructions to select the set of malicious code samples from a training dataset of malicious code samples.

13. The non-transitory machine-readable medium of claim 9, wherein the instructions to form a training dataset with at least a subset of the rewritten malicious code samples comprise instructions to select, for each of the set of malicious code samples, a subset of the rewritten malicious code samples rewritten based on the corresponding one of the malicious code samples.

14. The non-transitory machine-readable medium of claim 9, wherein the program code further comprises instructions to train a malware detection model with the training dataset.

15. An apparatus comprising:

a processor; and a non-transitory machine-readable medium having instructions stored thereon, the instructions executable by the processor to cause the apparatus to, augment a training dataset with rewritten malicious code samples, wherein the instructions to augment the training dataset comprise instructions executable by the processor to cause the apparatus to, prompt a language model to rewrite each of a plurality of malicious code samples according to at least one code obfuscation technique, wherein the instructions to prompt the language model to rewrite each malicious code sample into multiple obfuscated transformations comprise instructions executable by the processor to cause the apparatus to, select a plurality of obfuscating transformations tasks, wherein each of the plurality of obfuscating transformation tasks is different; and prompt the language model to rewrite the malicious code sample according to each of the plurality of obfuscating transformation tasks, to preserve functionality of the malicious code sample in the obfuscated transformations, and to explain why the rewrite does not modify functionality of the malicious code sample;

evaluate output of the language model as being valid code and maintaining functionality of the corresponding one of the plurality of malicious code samples, wherein the evaluation yields the rewritten malicious code samples; and train a malware detection model with the augmented training dataset which includes the rewritten malicious code samples.

16. The apparatus of claim 15, wherein the instructions to evaluate output of the language model as maintaining functionality of a corresponding one of the plurality of malicious code samples comprise instructions to evaluate the output and the corresponding one of the malicious code samples to determine that the output satisfies similarity criteria corresponding at least to execution behavior and program language keywords.

17. The apparatus of claim 15, wherein the instructions to evaluate output of the language model for each of the plurality of malicious code samples as being valid code and maintaining functionality of the corresponding one of the plurality of malicious code samples comprise instructions executable by the processor to cause the apparatus to filter out each rewritten malicious code sample generated from the malicious code sample that is invalid or does not maintain functionality and select from remaining ones of the rewritten versions of the malicious code sample.

18. The apparatus of claim 15, wherein the instructions to prompt the language model to rewrite the malicious code sample according to each of the plurality of obfuscating transformation tasks comprise instructions executable by the processor to cause the apparatus to prompt the language model to rewrite the code sample according to different orderings of multiple of the plurality of obfuscating transformation tasks.

19. The apparatus of claim 15, wherein the instructions to prompt the language model to rewrite the malicious code sample according to each of the plurality of obfuscating transformation tasks comprise instructions executable by the processor to cause the apparatus to prompt the language model to rewrite the code sample into the multiple obfuscated transformations with successively more obfuscation.

* * * * *